Feb. 23, 1971   W. W. VYVYAN ET AL   3,564,789
EXTENDABLE-RETRACTABLE BOX BEAM
Filed Dec. 9, 1968   3 Sheets-Sheet 1

*INVENTOR.*
WESLEY W. VYVYAN
LAURENCE H. WARDEN
RICHARD E. HUNTER
BY
*Carl R. Brown*
ATTORNEY

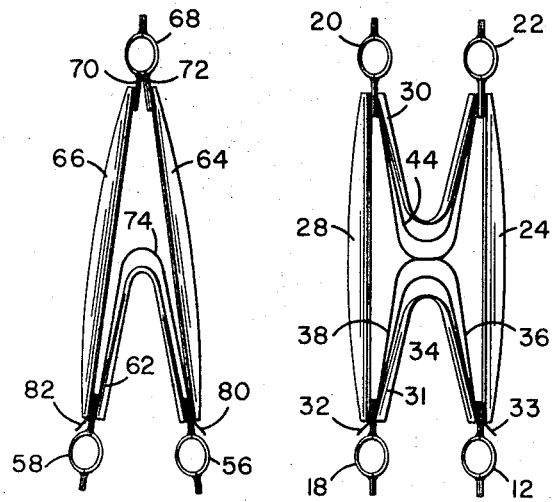
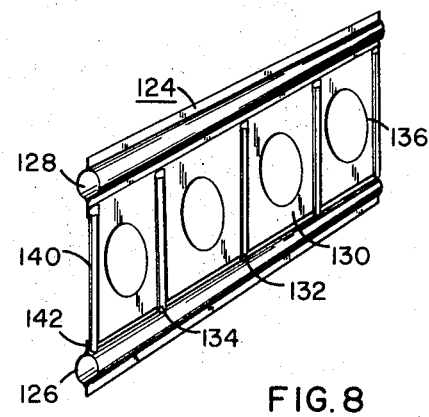
FIG.5  FIG.3  FIG.8
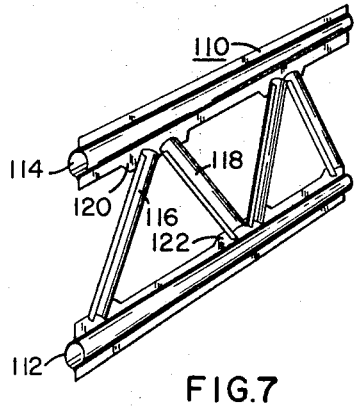
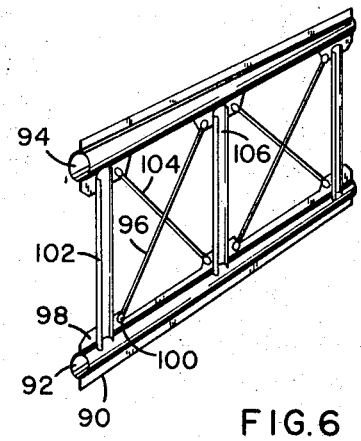
FIG.7  FIG.6
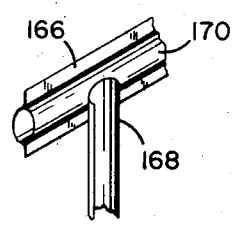
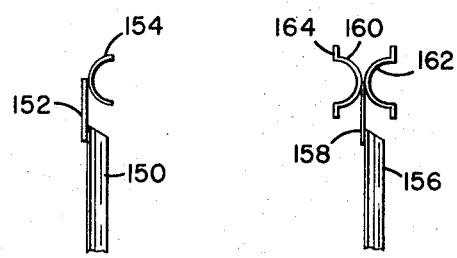
FIG.11  FIG.9  FIG.10
INVENTOR.
WESLEY W. VYVYAN
LAURENCE H. WARDEN
RICHARD E. HUNTER
BY
Carl R. Brown
ATTORNEY Feb. 23, 1971    W. W. VYVYAN ET AL    3,564,789
EXTENDABLE-RETRACTABLE BOX BEAM
Filed Dec. 9, 1968    3 Sheets-Sheet 3

INVENTOR.
WESLEY W. VYVYAN
LAURENCE H. WARDEN
RICHARD E. HUNTER
BY

ATTORNEY

United States Patent Office

3,564,789
Patented Feb. 23, 1971

3,564,789
EXTENDABLE-RETRACTABLE BOX BEAM
Wesley W. Vyvyan and Laurence H. Warden, San Diego, and Richard E. Hunter, Poway, Calif., assignors to The Ryan Aeronautical Co., San Diego, Calif.
Filed Dec. 9, 1968, Ser. No. 782,170
Int. Cl. E04h *12/10*
U.S. Cl. 52—108        15 Claims

ABSTRACT OF THE DISCLOSURE

An extendable and retractable box beam structure that may be collapsed into a coil shape and selectively extended and expanded to a longitudinal and linear structure that forms a rigid box beam structure.

---

The longitudinal structural members are of thin resilient material with a curved cross section and are collapsible to a generally flat configuration for rolling, but are self-erecting to a rigid form by their own resilience when unrolled. Intercostal members connecting the longitudinal members in a frame or beam structure are similarly resilient and collapsible, and return to their preformed configuration when released. Three or four sided box beams can be collapsed into a substantially flat rolled form by folding certain of the intercostals.

BACKGROUND OF THE INVENTION

There are many applications for spar and box beam structural members of various configurations for use in remote locations, such as in space. However, moving such structure members to remote locations presents considerable transportation problems that are particularly acute where strong and rigid structures are required. Yet it is necessary to transport the structures to the remote locations and to assemble the structure at the site, usually by joining together many small pieces into, for example, remote antenna structures, reflectors, telescope structures, booms for large vehicles and other similar structures. While such structures can be transported to remote locations in disassembled form and then assembled at the site, this presents obvious problems in space as it tends to be impractical to lift heavy structures even in piece form into space and it is even more impractical to assemble intricate structures piece by piece in space.

Thus it is advantageous to have extendable-retractable spar structures, beam structures and composite box beam structures that are easily packaged in a relatively small volume for storage and transportation and when extended and deployed, comprise a large, reliable and highly efficient structure that is light weight and strong and that can be used to construct many different structures in remote locations and particularly in space.

SUMMARY OF THE INVENTION

In specific embodiments of this invention, spar sections are constructed of upper and lower longitudinal cap members. The cap members have a relatively thin wall with a curved cross section that is collapsible in a plane normal to the longitudinal length of the cap members, to a relatively flat cross section. The spar members can be rolled onto a reel, without permanently deforming the spar structure. The longitudinal cap members are joined together along their length with rigid intercostals that are bendable in the same plane as the longitudinal cap members and that may comprise connecting structures that are similar to the longitudinal cap members or of thin material having semi-circular or contoured cross sections. The spar members may be connected together to form, for example a rectangular, extendable, retractable box beam or a triangular shaped box beam. Similar collapsible intercostals interconnect the respective spar sections of the box beam structure. Other intercostals comprising cables or thin straps are secured between respective portions of the cap members adding rigidity to the structure.

In one specific embodiment, the longitudinal cap members comprise aligned sides of thin, spring, sheet metal that are joined at their longitudinal edges and bow outwardly forming a substantially cylindrical configuration. While the aligned sides in the bowed condition are pressed together forming a substantially flat member that may be spiraled without deforming the spring material, the spring material when released, expands to the outwardly bowed condition forming a longitudinal structure that has considerable rigidity against torsional forces, bending forces, and shear forces. In another specific embodiment, the cap members comprise longitudinal strips of thin material having a semi-circular contoured cross section. The semi-circular cross section can be collapsed to a flat structure and spiraled on a reel. In still another specific embodiment, a pair of the longitudinal semi-circular contoured members are joined at their outer surfaces at the midpoint of their outer surfaces forming a collapsible structure that may be collapsed to a flat cross section and rolled on a reel or other mechanism.

All of these specific embodiments utilize flexible, preformed sections that are capable of deforming to flat, linear structures that are spiraled to a reduced volume. The structure may be rolled on a storage drum that is rotated by a power system or other suitable means. The drum, for example, is rotated clockwise and the box beam is unwound from the drum. The plane of the spiral beam extension is controlled by the location of support guides on the drum support, which guides are contoured to the shape of the cap elements. In retraction, the rotational direction of the drum is reversed and the cap elements are flattened by guide rollers and the box beam is wrapped in a spiral on the drum. The box beam cap may be constructed of metallic or non-metallic high strength material that is preformed to a desired expanded contour shape. The shape and thickness of the material is selected to fulfill the specific load requirements and to allow full element flattening without yielding or deforming the material.

It is therefor an object of this invention to provide a new and improved spar or box beam structure.

It is another object of this invention to provide a new and improved spar or box beam structure that is lightweight and yet forms a rigid, strong and highly efficient structure or structural element.

It is another object of this invention to provide a new and improved spar or box beam structure that is capable of being retracted into a small and compact volume.

It is another object of this invention to provide a new and improved spar or box beam structure that is lightweight, and yet provides a strong and rigid structure, that may be rolled onto a storage drum and extended from a storage drum into a fully assembled spar or box beam structure.

Other objects, novel features, and advantages will become more apparent upon a review of the following detailed specification and an examination of the drawings in which:

FIG. 3 is an end view of the rectangular box beam structure of FIG. 1 in the partially collapsed condition.

FIG. 5 is an end view of the triangular box beam structure of FIG. 4 in the partially collapsed condition.

FIG. 6 is a perspective view of a section of a spar structure of this invention.

FIG. 7 is a perspective view of a section of a modified form of the spar structure of this invention.

FIG. 8 is a perspective view of a section of still another modified spar construction of this invention.

FIG. 9 is an end view of a structural element that is used to construct spars and box beams in this invention.

FIG. 10 is an end view of still another modified structural element that is used to construct spars and box structures of this invention.

FIG. 11 is a perspective view of still another structural element that is used to construct spars and box beam structures of this invention.

Figure 1:
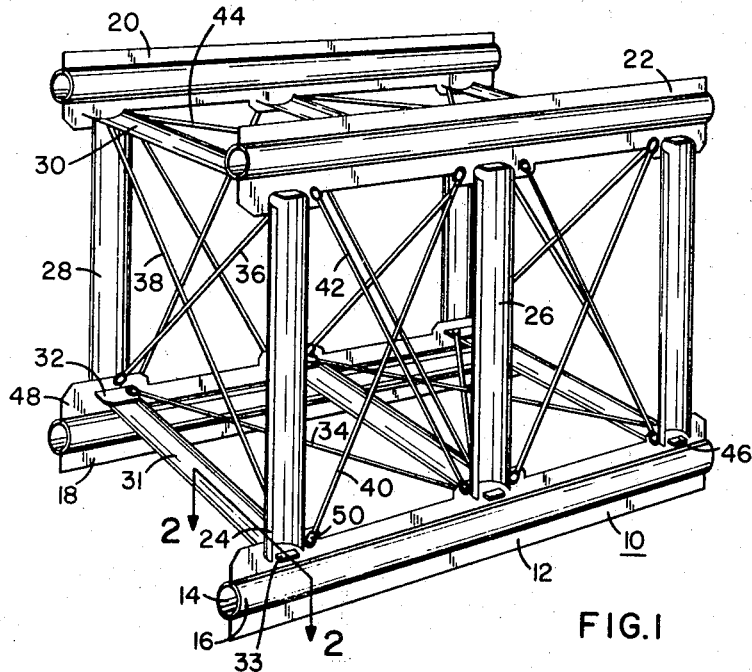
FIG. 1 is a perspective view of a section of an extendable-retractable rectangular box beam structure of this invention.

Referring now to FIG. 1, a rectangular extendable-retractable box beam structure 10 has four longitudinal cap members 12, 18, 20 and 22. These cap members may be made of any suitable thin spring material that is metallic or non-metallic, such as steel, titanium, plastics or fiberglass, or other suitable materials. The cap members comprise aligned sides 14 and 16 of thin spring material that are joined at their longitudinal edges and that bow outwardly having an open internal volume forming a cylindrical configuration. This cylindrical configuration is collapsible to a substantially flat structure in the plane of the longitudinal edges by applying force against the sides 14 and 16. When the sides of the bowed out portions are collapsed inwardly, the cap members become a substantially flat member that may be rolled into a spiral onto a drum, reel or other suitable device. This rolling does not deform the cap members. Thus when the cap members are rolled off the reel, the side members 14 and 16 spring outwardly forming the cylindrical cap members that have longitudinal rigidity, and resistance against shear forces and torsional forces.

Intercostal members 24, 26, and 28, for example, are spaced along the length of the cap members and are normally made of the same or similar material that was used to make the cap members. The intercostals have a semicircular contoured cross section and are rigidly connected at their ends to raised portions 48 on the edges of the cap members. The intercostal members 24, 26, and 28 may be rigidly joined to the cap members by welding, braising, bonding or by other suitable known techniques.

Horizontal intercostal or web members are secured to the adjacent sides of the cap members. The intercostal members 30 and 31 have the same configuration as intercostal members 24 and 26, except that the horizontal intercostal members have plates 32 braised, welded, or bonded to the upper, center, outer surface at their opposite ends. The plates 32 have end tabs 33 that project through slots in the raised edge portions 48 that secure the ends of the intercostal members 30 and 31 into abutting position against the surfaces 48. This allows the ends of the intercostal members 30 and 31 to pivot upwardly upon the contraction or collapsing of the beam structure.

Other intercostal members comprise cables 34, 36, 38, 40 and 42 that connect across the box beam structure and form a restraining support. These other intercostal members can be cables or thin strips of metal. They are secured in any suitable manner to the raised portions 48 and to the plates 42 such as by end extensions that are fastened by resistance welding, bonding, gussets, or in any suitable manner.

Figure 12:
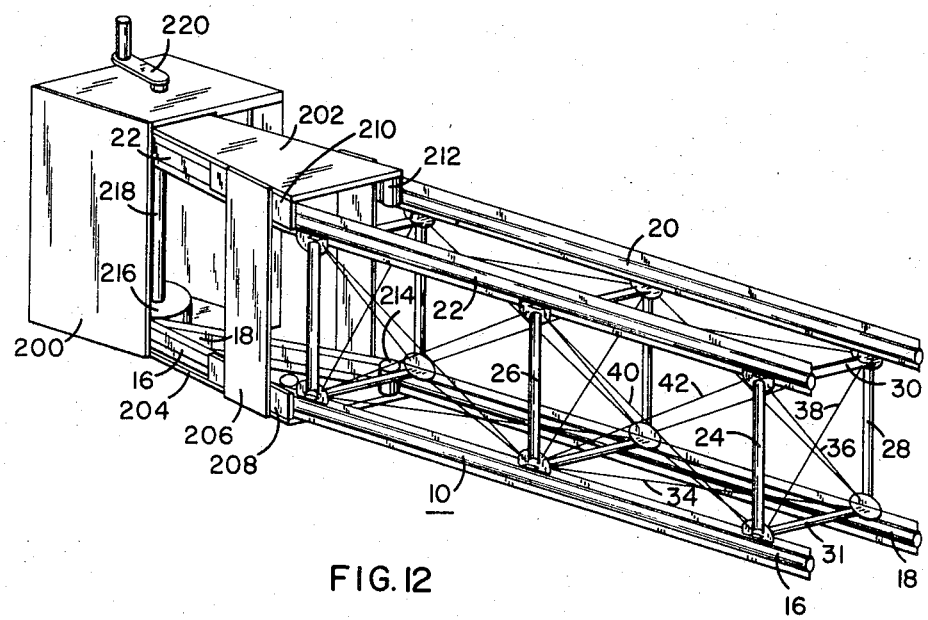
FIG. 12 is a perspective view of the means for extending and retracting the spars and box beam structures of this invention.
Figure 13:
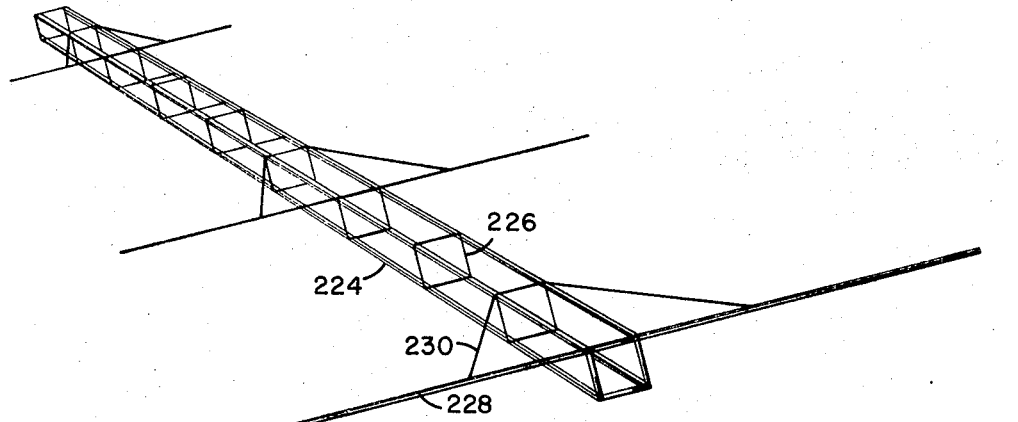
FIG. 13 is an illustrative view of the use of the retractable-extendable box beam structure of this invention as an antenna structure in space.

The box beam structure of FIG. 1 may be collapsed by a suitable reel structure and mechanism, see FIG. 12. A representative structure for rolling in, retracting or extending the box beam structure has a housing 200 with an opening in one side. Positioned in the housing is an axle 218 with upper and lower reel wheels 216. The axle 218 and the reel wheels 216 are turned by a crank 220. Extending from the opening is an upper plate 202 and a lower plate 204, that are secured together by side plates 206. Guide plates 208 and 210, that may be made of teflon or other suitable materials, are secured to the side plates 206. Rollers 212 and 214 are secured to plates 202 and 204 in a position adjacent the plates 210 to impart compressive force against the cap members 12, 18, 20 and 22. The intercostal members 206 are rolled into the guide plates and are flattened out on the reel through compressive force. The cables 42 and the horizontal intercostal members 30, see FIG. 3, bend inward and are supported within the collapsed box beam structure 10. The entire box beam structure is collapsed into a relatively flat structure that is rolled on reel 218 and around the reel wheels 216, with the entire structure being reeled into the enclosed box structure 200. While the reel is illustrated as being turned by crank 220, it may be understood that the reel structure can be rotated by any suitable mechanical means such as a motor or other suitable mechanism.

Figure 2:
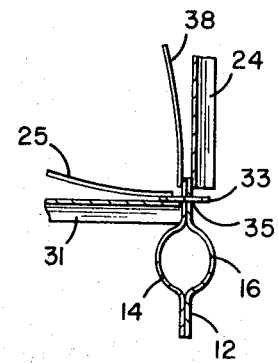
FIG. 2 is a cross sectional view taken along lines 2—2 of FIG. 1.

FIG. 2 illustrates the cross sectional structure of the cap member 12 and the expanded sides 14 and 16 with the slot 35 therethrough that receives the tab end 33. FIG. 3 illustrates the box beam structure of FIG. 1 in the partially collapsed condition. The horizontal intercostal members 30 and 31 are bent in an upward and downward direction and the cables 34, 36, 38, 40 and 42 are carried in an upward and downward direction by the movement of the horizontal intercostal members 30 and 31.

Figure 4:
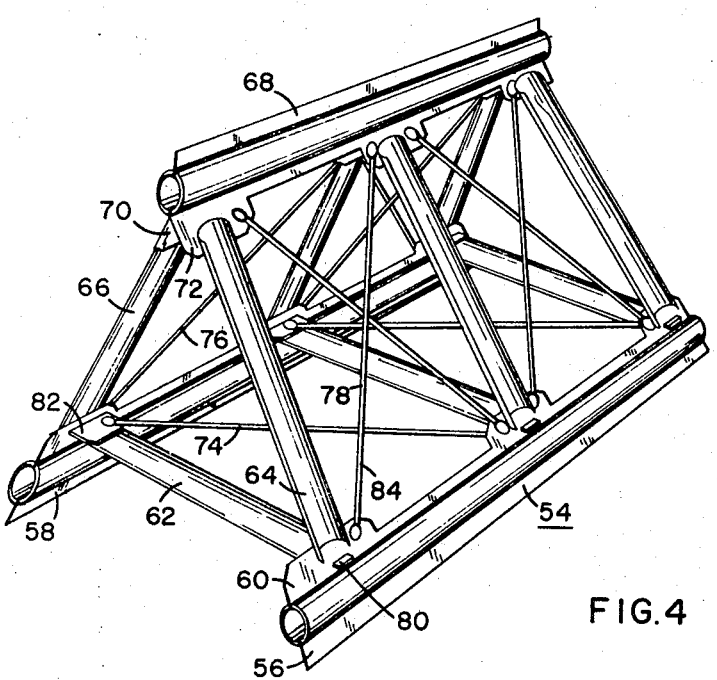
FIG. 4 is a perspective view of a section of a triangular box beam structure of this invention.

The box beam may also be constructed as a triangular box beam structure as illustrated in FIG. 4. In this embodiment, the upper single, cap member having diverging edge portions 70 and 72 to which are secured the ends of the vertical intercostal members 64 and 66. Also in this embodiment, the flexible intercostal members 78 comprise this strap material that may be made of metal similar to the metal or material used in making the cap members and the other intercostal members. The triangular shaped box beam of FIG. 4 may be collapsed in the same manner as illustrated in FIG. 12 wherein the rollers 212 and the upper plates 210 are moved to the center of the plate 202. FIG. 5 illustrates the triangular shaped box beam of FIG. 4 in the partially collapsed condition with the center intercostal members 62 bowed upwardly and the strap members 74 pushed in an upward direction.

It maybe understood that the box beams of FIGS. 1 and 4 may be constructed from several different spar stuctures or the spar structures, per se, may be used as extendable and retractable structural members for any given structure. Examples of modified forms of the spar structures are illustrated in FIGS. 7, 8, 9, 10, and 11. The spar structure of FIGS. 1 and 4 are illustrated in FIG. 6. The spar structure 90 has a lower cap member 92 and an upper cap member 94 with intercostal members 102 and 106 that are secured to raised edge portions 98. Cables 96 and 104 provide the restraining cross support of the spar structure. with reference to FIG. 7, the spar structure 110 comprises a lower cap member 112 and an upper cap member 114 with diagonal intercostal members 116 and 118 that have the curved semi-circular structure as previously described. In this embodiment, the cable or strap intercostal members are eliminated.

In the spar structure 124 of FIG. 8, the intercostal members comprise sheet material 130 having support pieces 132 and 134 that are secured at their longitudinal outer surface to the sides of the sheet members 130. The sheet members 130 have open spaces 136 to reduce weight, and the edges of the sheet members are secured between the adjacent longitudinal edges of the upper and lower cap members 126 and 128. In other modified spar constructions, the cap members may comprise a longitudinal member 154, see FIG. 9 made of thin material having a semi-circular contoured cross section as previously described relative to the intercostal members 24 and 28. An intercostal member 150 is secured to the semi-circular contoured cap member 154 by a plate member 152 that is secured to the center portion of the outer surface of the end of the intercostal member 150 to the centered side surface of the outer surface of the cap member 154. Referring to FIG. 10, the cap member comprises a pair of longitudinal semi-circular contoured cross section members 160 and 162 that are joined at their adjacent centered outer surfaces and have outwardly directed longitudinal edge portions 164 that provide added rigidity to the cap structure. Plate members 158 are secured between the adjacent surfaces of the contoured section 160 and 162 and have a downward portion that is connected to the outer centered surface of the intercostal member 156. In FIG. 11 the intercostal member may be secured by braising, welding, or the like to one of the outer side surfaces of the cap structure that comprises the thin sides of spring material that are joined at their longitudinal edges and that bow outwardly. Each of the foregoing structures may form a separate spar sturcture or may form a spar structure used in the box beam structure as illustrated in FIG. 1 or 4, each of which can be collapsed into a retractable structure on a reel as illustrated in FIG. 12.

In operation, the aforesaid box beam structures or spar structures are retracted into a small light weight volume and transported to any place of use, such as in space. The structure is then extended to be used to make any suitable composite structure such as illustrated in FIG. 14, where a rectangular box beam structure 224 having intercostals 226 functions as an antenna structure having diapoles 228 that have support lines 230. The structure is extended in space above the earth 232.

Thus it may be understood that large structures can be packaged in a small volume and yet the structures when extended have exceptional strength characteristics against bending, sheer and torsion forces. The dynamic launch force and storage volume requirements are completely minimized for spacecraft applications. The simplicity of the structure provides maximum reliability with only a small force required to extend and retract the box beam structure.

Having described our invention, we now claim:

1. An extendable-retractable box beam that is selectively collapsible to a reduced volume in the retracted condition and extendable to rigid box beam structure comprising:
  at least three longitudinal cap members each having relatively thin resilient walls with a normally curved cross section that is forcibly collapsible to a relatively flat cross section in a given plane,
  said cap members in the extended position being parallel in the longitudinal direction and spaced from each other,
  and spaced intercostals of resilient material with a normally curved cross section that are forcibly bendable in a given plane interconnecting said cap members in space defining relationship, said spaced cap members and spaced intercostals forming a box beam in the extended condition.

2. An extendable-retractable box beam as claimed in claim 1 in which said cap members comprising aligned sides of thin spring material that are joined at their longitudinal edges and that bow outwardly forming a cylindrical configuration that is collapsible to a substantially flat configuration in the plane of said longitudinal edges, said intercostals being secured to the joined edges of said sides.

3. An extendable-retractable box beam as claimed in claim 1 in which the ends of certain ones of said intercostals are fixedly connected to said cap members at spaced intervals along the length thereof, forming adjacent ribs.

4. An extendable-retractable box beam as claimed in claim 3 including the ends of others of said intercostals are pivotally connected at spaced intervals between said cap members, forming adjacent ribs.

5. An extendable-retractable box beam as claimed in claim 3 in which the ends of said certain ones of said intercostals are secured to the adjacent longitudinal edges of said cap members by the convex outer surface of the intercostals.

6. An extendable-retractable box beam as claimed in claim 3 in which the ends of said ones of said intercostals being secured to the outer surface of one of the bowed sides of the said cap members with the outer convex surface of said intercostals abutting said outer surface of said bowed sides.

7. An extendable-retractable box beam as claimed in claim 4 in which:
  the end edges of said others of said intercostals abutt the adjacent sides of adjacent longitudinal edges of said cap members,
  and tab plates secured to the outer center surface of said others of said intercostals with end projections that project pivotally through slots in said longitudinal edges of said cap members.

8. An extendable-retractable box beam as claimed in claim 1 in which said cap members and said intercostals comprise members of thin material having semi-circular contoured cross sections.

9. An extendable-retractable box beam as claimed in claim 8 including plate members secured to the outer convex surface of said cap members and to the outer convex surface of ends of said intercostals for fixedly securing said cap members to said intercostals.

10. An extendable-retractable box beam as claimed in claim 1 in which:
  each of said cap members comprising a pair of longitudinal members of thin material having semi-circular contoured cross sections with the outer convex surfaces of said longitudinal members being joined together,
  and said intercostals comprising members of thin material having semi-circular contoured cross sections.

11. An extendable-retractable box beam as claimed in claim 10 in which the outer longitudinal edges of said semi-circular contoured cross sections have substantially flat longitudinal edge portions that are angled outwardly from the semi-circular contoured cross section portions.

12. An extendable-retractable box beam as claimed in claim 11 including plate members having one side secured between the adjacent convex surfaces of said longitudinal members of said cap members and the other side secured to the outer convex surface of ends intercostals for fixedly securing said cap members to said intercostals.

13. An extendable-retractable box beam as claimed in claim 1 and including a sheet of resilient material with side edges secured to and connecting adjacent ones of said longitudinal cap members, said intercostals being secured by their outer convex surfaces to said sheet material substantially normal to the longitudinal length of said cap members, forming rib sections.

14. An extendable-retractable box beam as claimed in claim 1 in which, said box beam includes one upper longitudinal cap member and a pair of lower cap members forming a triangular shaped box beam, the intercostals connecting said lower cap members being foldable upwardly for collapsing the box beam to a substantially flat condition.

15. An extendable-retractable box beam as claimed in claim 1 in which said box beam having a pair of upper longitudinal cap members and a pair of lower cap members forming a rectangular box beam, the intercostals connecting said cap members along two opposed sides of the box beam being foldable inwardly between the other sides.

References Cited

UNITED STATES PATENTS

| | | | |
|---|---|---|---|
| 1,115,491 | 11/1914 | Bindley et al. | 52—646 |
| 1,677,577 | 7/1928 | Amiot | 52—731 |
| 2,130,993 | 9/1938 | Dubilier | 52—108 |
| 3,258,800 | 7/1966 | Robinsky | 52—108 |
| 3,385,397 | 5/1968 | Robinsky | 52—108 |
| 3,434,254 | 3/1969 | Rubin | 52—108 |
| 3,474,579 | 10/1969 | Kieser | 52—108 |
| 3,486,279 | 12/1969 | Webb | 52—108 |

HENRY C. SUTHERLAND, Primary Examiner

U.S. Cl. X.R.

52—646